United States Patent [19]

Spann

[11] Patent Number: 4,700,447

[45] Date of Patent: Oct. 20, 1987

[54] SUPPORT PAD AND METHOD OF MANUFACTURE

[75] Inventor: Donald C. Spann, Greenville, S.C.

[73] Assignee: Span America Medical Systems, Inc., Greenville, S.C.

[21] Appl. No.: 839,337

[22] Filed: Mar. 13, 1986

Related U.S. Application Data

[62] Division of Ser. No. 530,519, Sep. 9, 1983, Pat. No. 4,603,445.

[51] Int. Cl.[4] ........................ B23P 17/00; A47C 27/14; B29C 49/00

[52] U.S. Cl. .......................................... 29/418; 5/481; 264/284

[58] Field of Search ........................ 264/280, 284, 293; 425/374, 385; 29/418; 5/481, 468

[56] References Cited

U.S. PATENT DOCUMENTS

| | | | |
|---|---|---|---|
| 2,371,788 | 3/1945 | Webber . | |
| 2,785,739 | 3/1957 | McGregor, Jr. et al. | 5/481 |
| 2,788,061 | 4/1957 | Pedrocchi | 5/481 |
| 2,831,532 | 4/1958 | Kaspar | 5/481 |
| 3,761,338 | 9/1973 | Ungar et al. | 264/284 |
| 3,885,257 | 5/1975 | Rogers | 5/481 |
| 3,914,365 | 10/1975 | Kim et al. | 264/284 |
| 4,064,578 | 12/1977 | Yamada | 5/481 |
| 4,070,719 | 1/1978 | Morgan | 5/468 |
| 4,106,139 | 8/1978 | Southard | 5/481 X |
| 4,178,161 | 12/1979 | Rudner et al. | 264/284 |
| 4,335,476 | 6/1982 | Watkin | 5/481 |
| 4,603,445 | 8/1986 | Spann | 5/481 |

FOREIGN PATENT DOCUMENTS

| | | |
|---|---|---|
| 1729995 | 8/1971 | Fed. Rep. of Germany . |
| 1281638 | 12/1961 | France . |
| 526407 | 5/1955 | Italy . |

*Primary Examiner*—P. W. Echols
*Assistant Examiner*—Steven Nichols
*Attorney, Agent, or Firm*—Dority & Manning

[57] ABSTRACT

A unitary support pad constructed of synthetic foam is described especially for use as a mattress pad for hospital patients. The pad has a number of discrete upstanding projections being independently compressible and formed in the pad so as to provide a generally flat surface with voids between the projections, preferably extending entirely through the pad, formed by compressing the foam, in discrete areas, which is severed as through the action of a transverse band saw while compressed.

16 Claims, 26 Drawing Figures

Fig. 1.
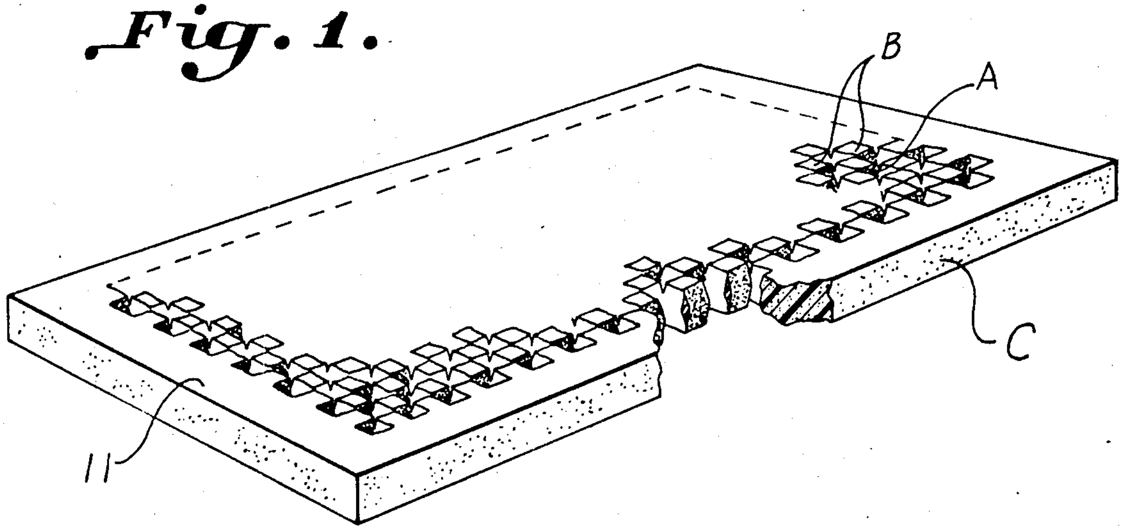
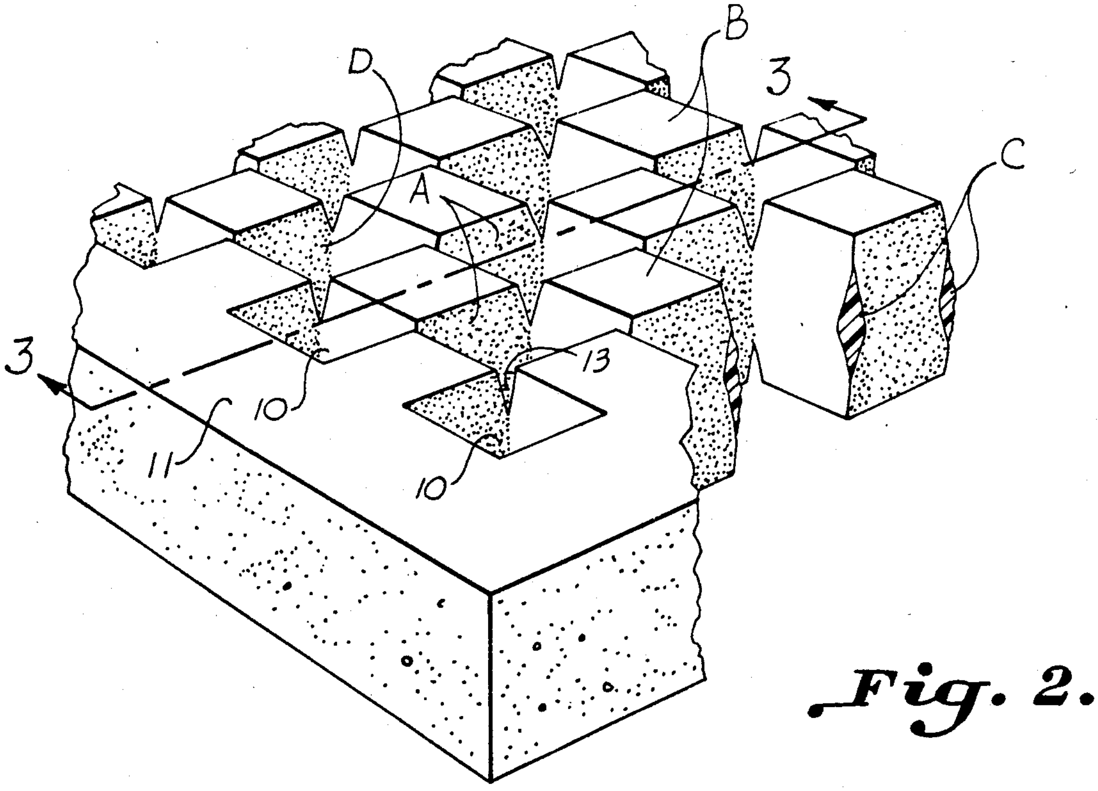
Fig. 2.

Fig. 16-A.

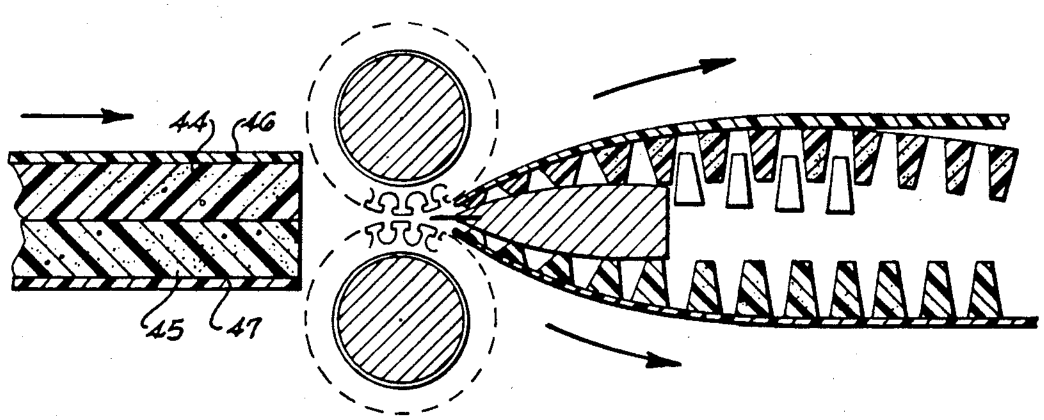
Fig. 17.
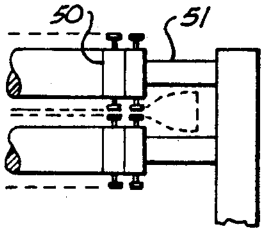
Fig. 17-A.
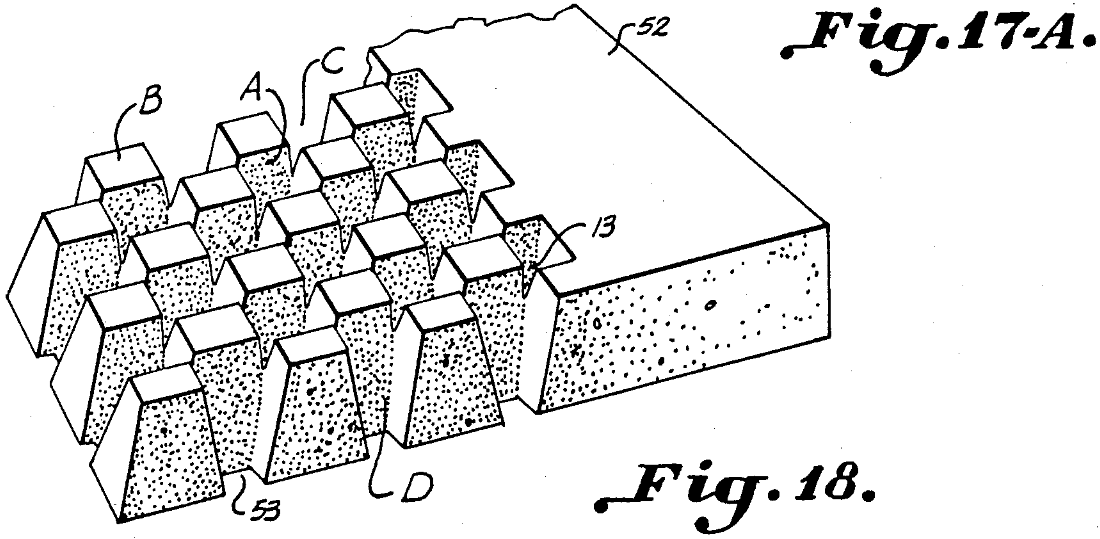
Fig. 18.
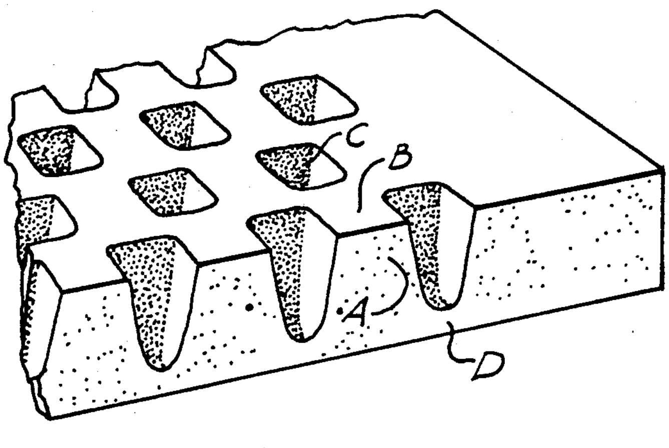
Fig. 18-A.

SUPPORT PAD AND METHOD OF MANUFACTURE

This is a divison of application Ser. No. 06/530,519, filed Sept. 9, 1983 now U.S. Pat. No. 4,603,445.

BACKGROUND OF THE INVENTION

Convoluted pads are provided for use as mattress covers and as general supports as well as for cushioning. Such pads comprise a dimpled surface on one side of the foam pad, such dimpled surface being formed by passing a flat pad forming blank through a convoluter machine which has a pair of rolls with opposed spaced projecting members arranged in a pattern, and while the pad is compressed between the rollers, subjecting the pad to the action of a transverse saw splitting the pad to form a pair of convoluted pads each having the dimpled surface on one side. The dimpled surface in cross section is thus formed in a generally sinuous configuration.

Although convoluted pads have been used effectively for many years,, limitations are imparted as to their use because of the curved or pointed peaks in the dimpled surface. The curved apex or peak portions tend to come to a point and, therefor, exert a localized pressure upon the body of a person using the pad which tends to cut off the circulation requiring turning of the user to avoid subjection to such pressure points over prolonged periods of time.

The prior art also contemplates many variations such as the sawing of squares in the surface of a pad forming narrow channels between closely spaced projections. In such instances there is increased albeit limited air flow and compressability.

Accordingly, it is an important object of this invention to provide a foam pad to afford relatively large well ventilated areas of support for the user.

Another important object of the invention is the provision of a pad having discrete flat surfaces offering support over substantial areas and which operate as individually compressible cushions promoting air flow thereabout.

Another object of the invention is to provide increased air flow in the area adjacent the body of the user through spaces between the spaced cushions or projections, especially where such spaces or voids extend entirely through the pads.

While the pad is described herein in connection with its use as on a mattress and particularly for institutional use, such as in hospitals, it is to be understood that the pads hereof may be used for other purposes, such as insulating, cushioning or any other general uses.

The pads constructed in accordance with the invention provide the important advantage of better distribution of pressure with increased air flow.

SUMMARY OF THE INVENTION

A unitary pad constructed of flat foam material has been provided wherein rows of spaced upstanding projections or promontories are integrally formed therein. Each of the projections has a void on each side and each has a flat apex surface forming a generally flat surface on at least one side of the pad. The projections are integrally connected adjacent opposite corners in such a way as to provide independent movement of the projections. The method of forming the foam pads contemplates the use of a flat die carried opposite driven roller means for transporting the foam pad material beneath the roller so that foam is forced into recesses within the die and subjecting the compressed pad to the action of a transverse band saw for severing the compressed portions of foam within the recesses to form voids within the foam and to define the upstanding projections. The method further contemplates the introduction of one or more pad forming blocks together with one or more stacked compressible auxiliary block members between convoluter rolls and then sawing away compressed areas of the pad forming blocks or blanks while they emerge from the convoluter. The method further contemplates aligning the projections of the convoluter rolls in a wavy pattern forming wave projections extending across the pads having flat apex areas.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a foam pad constructed in accordance with the present invention, FIG. 2 is an enlarged perspective view, with parts broken away, further illustrating the foam pad of FIG. 1, showing the free standing projections formed in both surfaces thereof with voids extending entirely through the pads in generally checkerboard pattern, FIG. 17 is a longitudinal sectional elevation illustrating a pair of stacked pad forming blocks or blanks sandwiched between auxiliary blocks or sheets of compressible material preparatory to passing between the rolls of a convoluter prior to sawing or cutting between the pattern forming projections of the convoluter rolls for forming voids in a pad producing a checkerboard design with voids extending completely or partially through the support pad, FIG. 17-A is an end elevation illustrating a pair of stacked pad formed members, such as shown in FIG. 17, passing between the rolls of a convoluter wherein the wheels or profiling rings forming the convoluter rolls are discontinued over a border portion on each side of the pad to form a solid border or marginal portion of the pad with no voids or raised projections, FIG. 18 shows a pad having generally checkerboard projections on one side, formed in accordance with the method of FIGS. 17 and 17-A, providing a border on side edges, FIG. 18-A illustrates a pad similar to FIG. 18, except that the compression exerted by the convoluter wheels is not so pronounced so that the voids do not pass entirely through the pad or such may be formed as illustrated in FIG. 14.

DESCRIPTION OF A PREFERRED EMBODIMENT

The drawings illustrate a foam pad for use as a mattress cover and the like, having a plurality of upstanding projections or promontorys A each having a planar apex surface B. The blocks are formed integrally from a flat synthetic foam blank and the planar surfaces form a generally flat or continuous upper surface on at least one side of the pad. The projections are disposed in patterns such as aligned rows and are integrally carried by a base portion C of foam material formed in the blank. A void, preferrably slightly larger than the projections, is provided on each side of the projections forming valleys and the free standing projecting portions. Connecting foam portions D integrally join corners of the projections to corners of adjacent blocks in a next row. The connecting foam portions extend upwardly from the base and terminate short of said planar apex surfaces permitting independent movement of the projections as well as free movement of air.

Figure 3:
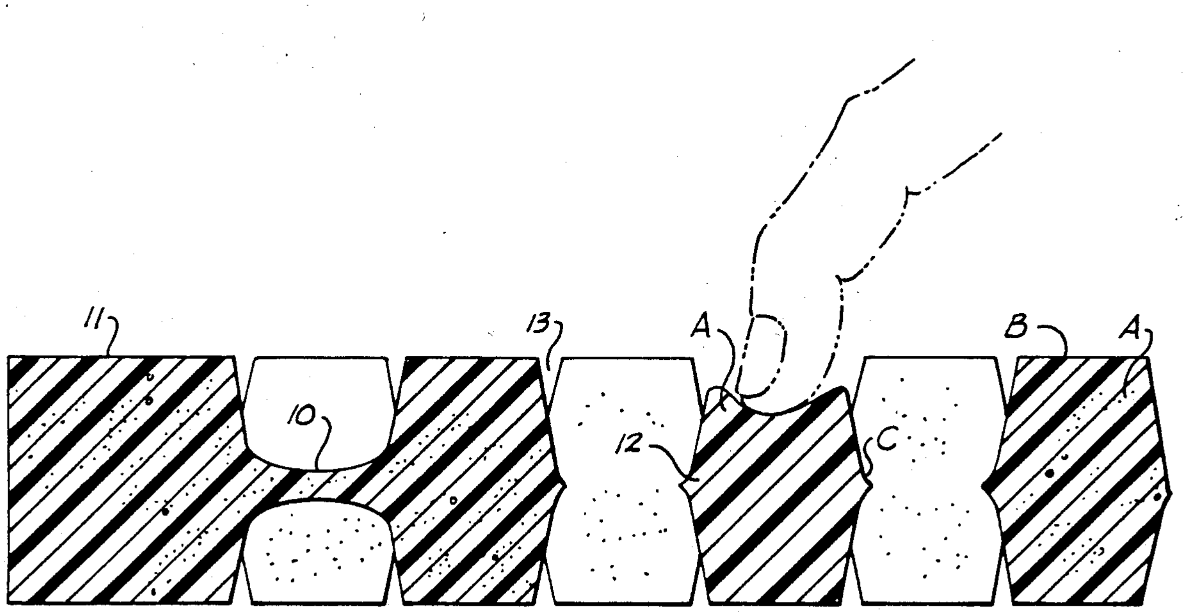
FIG. 3 is a transverse sectional elevation taken along the line of 3—3 in FIG. 2.

FIGS. 1, 2 and 3 illustrate a preferred embodiment of the invention wherein a substantially rectangular foam pad is illustrated, which is formed in such a way that a void on each side of the respective upstanding projections A extends entirely through the pad defining upstanding projections on both sides of the pad. As illustrated, a marginal row of voids has a bottom portion 10 that does not extend entirely through the pad, thus providing a substantial border portion for the pad. A marginal portion 11 may be provided wherein there are no voids. The projections and voids are of generally similar or comparable size, albeit slightly larger than the upstanding projections, and are in a generally checkerboard pattern.

Referring to FIG. 3, it will be noted that the base portion C is constituted by the connecting portions D which taper toward the medial portion forming a tapering ridge 12. It will be observed that the ridge 12 tapers outwardly and that the connecting portion D terminates to form a V-shaped notch 13. Such construction provides limited independent movement for each of the upstanding projections A which may be depressed as illustrated in FIG. 3, substantially independently of the neighboring upstanding projections or prominences A. Such movement causes air to move from hole to hole as the patient moves or turns. The free suspension of the projections produces an air pumping action promoting increased air flow with better transfer of heat and mosture. As will be described in greater detail below, the embodiment of FIGS. 1–3 is formed by passing the foam block from which the pad is formed into such a relationship to the forming apparatus as to subject both faces of the pad to a cutting action for removal of foam in the void portions.

Figure 4:
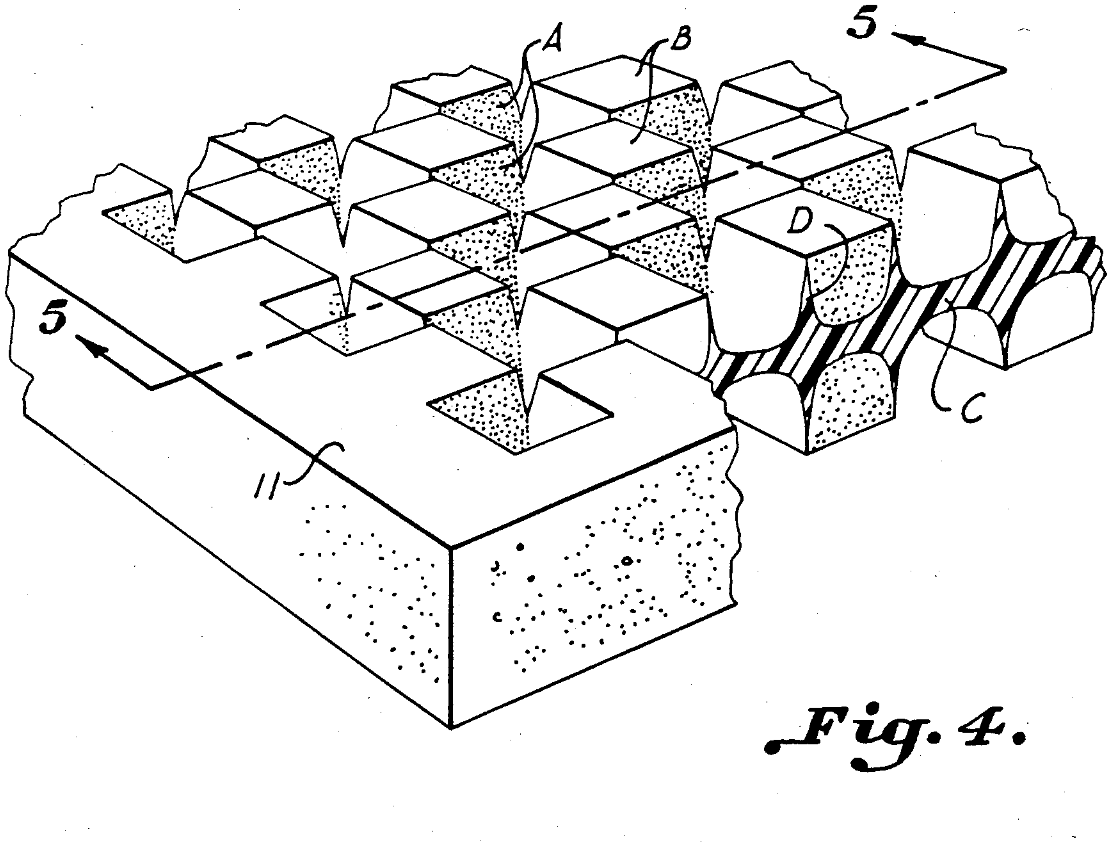
FIG. 4 is a perspective view, with parts broken away, illustrating a modified form of the invention wherein free standing projections are provided on both sides of the pad, but wherein voids on each side of the pad forming block or blank do not extend entirely through the pad.
Figure 5:
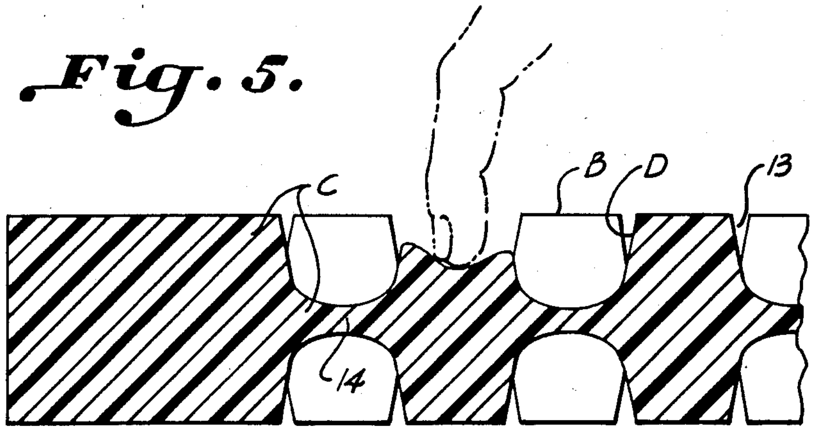
FIG. 5 is a transverse sectional elevation taken along the line 5—5 in FIG. 4.

FIGS. 4 and 5 illustrate an alternate form of the invention wherein the base portion is more pronounced in that the voids on each side of the upstanding projections do not extend entirely through the pad, but rather form a rib 14. It will be observed that the V-shaped cutout portions 13 are provided and afford limited independent movement for each of the projections A. It will also be observed that a border 11, wherein there are no voids, is provided to add stability to the pad.

Figure 6:
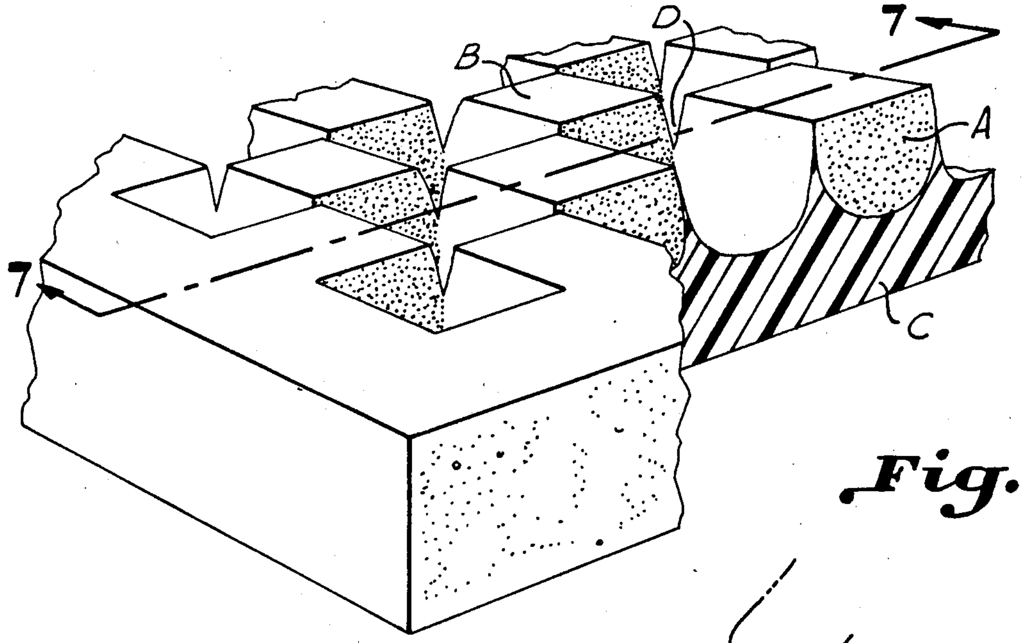
FIG. 6 is an enlarged perspective view, with parts broken away, illustrating a foam support with upstanding projections carried on one surface thereof manufactured in accordance with a modified form of the invention.
Figure 7:
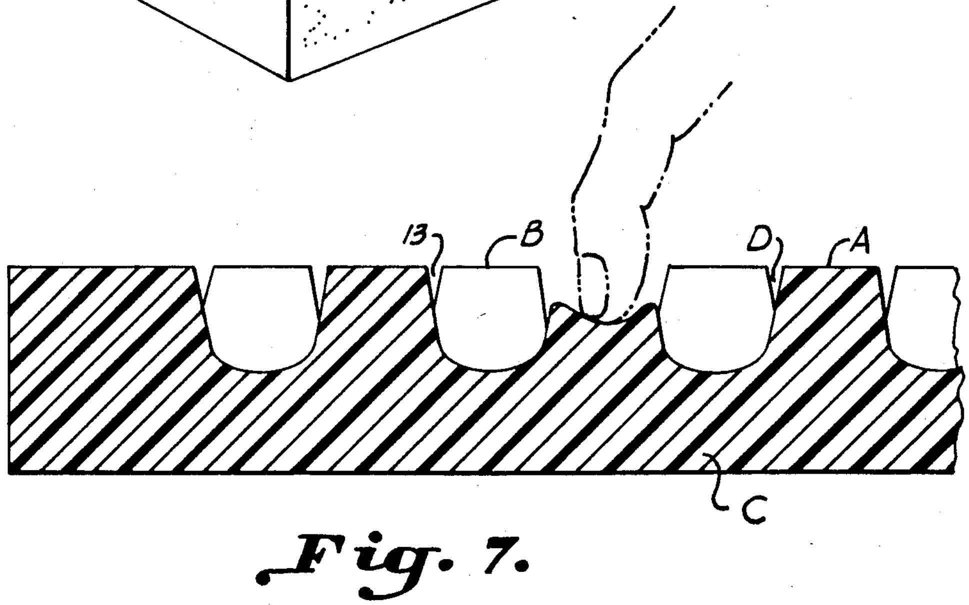
FIG. 7 is a transverse sectional elevation taken along the line 7—7 in FIG. 6.

FIGS. 6 and 7 illustrate a further modified form of the invention wherein upstanding projections A are provided on only one side of the pad. The pads of the embodiment of FIGS. 6 and 7 are formed by a single pass through the forming apparatus described below. It will be observed that the V-shaped cutout portions 13 again provide limited movement for the upstanding projecting blocks.

Figure 8:
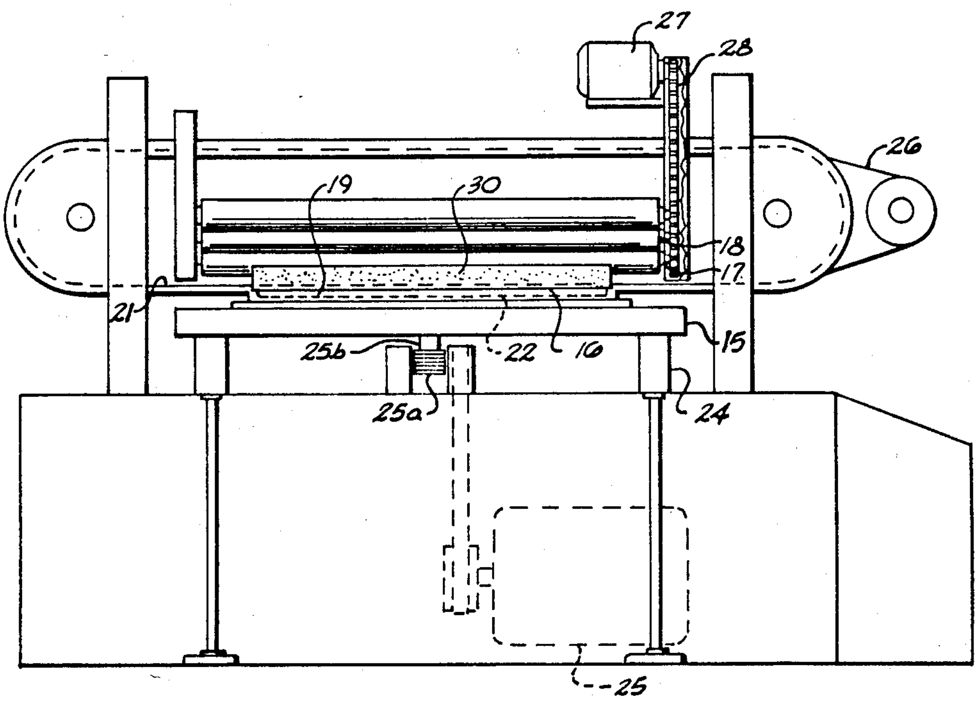
FIG. 8 is an end view of the apparatus illustrated in FIGS. 8 and 9 illustrating the method wherein a block preferably of greater or lesser density is placed over the foam block from which the pad is constructed.

FIG. 8 illustrates apparatus and method for suitably forming the pads described herein. In FIG. 8, the bed 15 of the machine is illustrated as movable back and forth so that the die 16 passes beneath the lower most roller 17 of roller means, which is illustrated as including a roller 18 mounted in a plane above the roller 17 for providing initial compression for the blank or foam block 19 from which the pads may be formed.

It will be observed that a transverse blade 21 of a band saw cuts the foam while in a compressed state, with pockets of compressed foam being carried within relieved or cutout portions 22 within the die 16. The foam is removed in discrete portions within the pads and such are connected as by a thin portion if the voids are to be so extensive so as to pass entirely through the pad. If the projections are to be in superposed relation on each side of the pad, a second run of the pad, as described above, must be carried out with the pad in registry with the position of first run in order that there be vertical alignment of the projecting blocks.

As illustrated in FIG. 8, the machine bed 15 is carried for movement back and forth on the frame member 24. Suitable driving means are illustrated, including a motor 25 which drives a gear *25a* which meshes with a rack *25b*. A suitable belt drive is illustrated at 26 for the blade 21 of the band saw. The lower run of the blade 21 is illustrated for removing the foam to form the voids defining the upstanding projections or blocks A. A motor 27 provides, through a chain drive 28, as suitable means for driving the rollers of the compression roller means which includes the rollers 17 and 18.

A suitable foam for the embodiments of the invention described above has been found to be open cell polyurethane, having a density of about 1.63 pounds per cubic foot and an indentation load deflection of about 34 to 38, although other materials may be found to be satisfactory.

As illustrated in FIG. 8, a relatively thin backup pad 30 having a greater, lesser or equal density than the foam may be utilized for manufacturing the pads hereof. The thickness of the auxiliary pad is important in determining the depth of cut.

Figure 9:
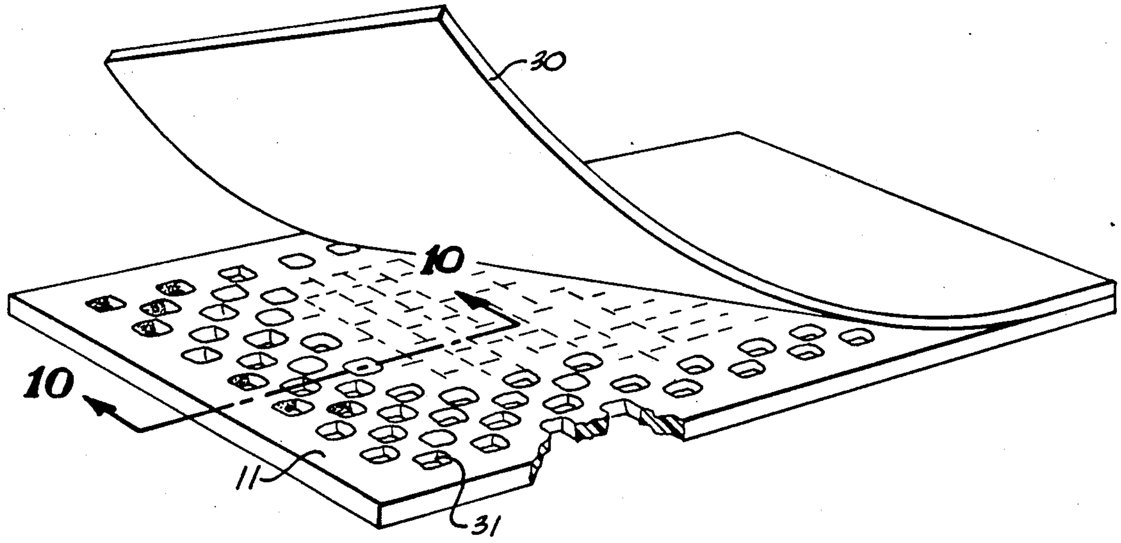
FIG. 9 is perspective view illustrating a pad constructed in accordance with a modified form of the invention utilizing a pad or block of greater, same or lesser density overlying the base pad from which the foam pads of the invention are constructed after passage through the apparatus.
Figure 10:
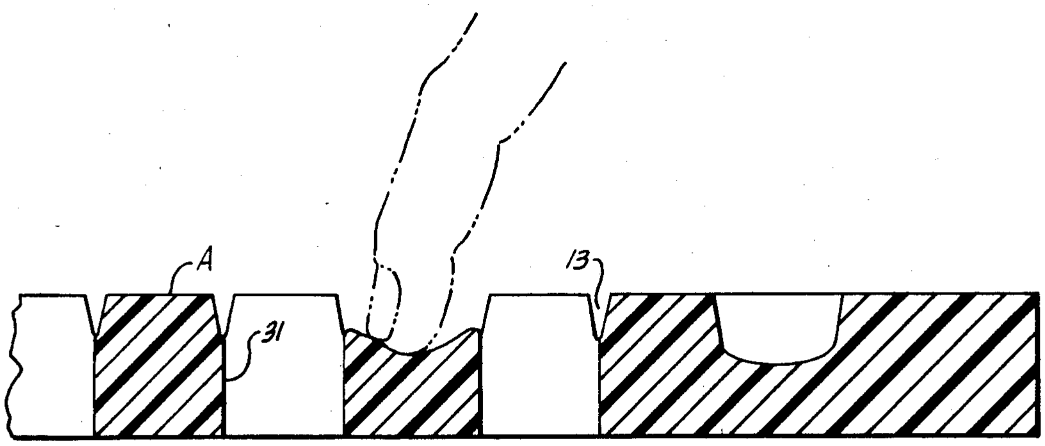
FIG. 10 is a sectional elevation taken along the line 10—10 in FIG. 9 illustrating a pad constructed in accordance with a modified form of the invention inverted after passage through the apparatus.

As illustrated in FIGS. 9 and 10, through the use of a pad 30, a void may be obtained which extends entirely through the pad as at 31. Again the V-shaped cutout portions afford independent movement for the upstanding projections A.

Figure 11:
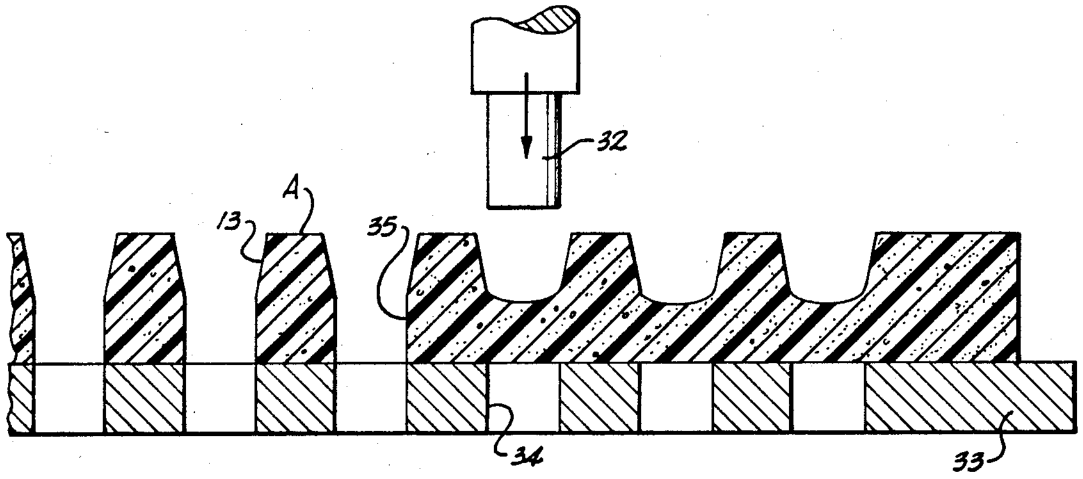
FIG. 11 is a sectional elevation illustrating a further modified form of the pad and apparatus constructed in accordance with the present invention manufactured utilizing a punch as shown or die clicking.

FIG. 11 illustrates a modified form of the invention wherein a series of punches, one of which is illustrated at 32, are utilized in connection with a die 33 having openings 34 therein for carrying the void entirely through the pad, as at 35, after the upstanding portions A are formed together with the V-shaped notches 13 for affording independent movement to the projections A. If desired die clicking may be utilized in lieu of the single or multiple punches.

Figure 12:
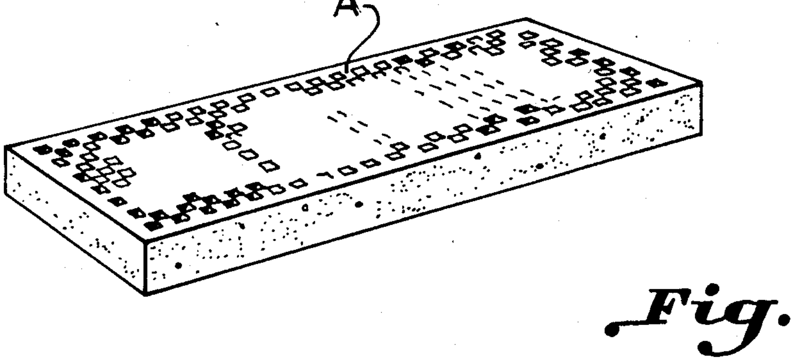
FIG. 12 is a perspective view illustrating a mattress constructed in accordance with a further modified form of the invention.

FIG. 12 illustrates a mattress. In this instance, the pad is in the form of the mattress itself, and includes the projecting blocks A with adjacent parts constructed as described herein.

Figure 13:
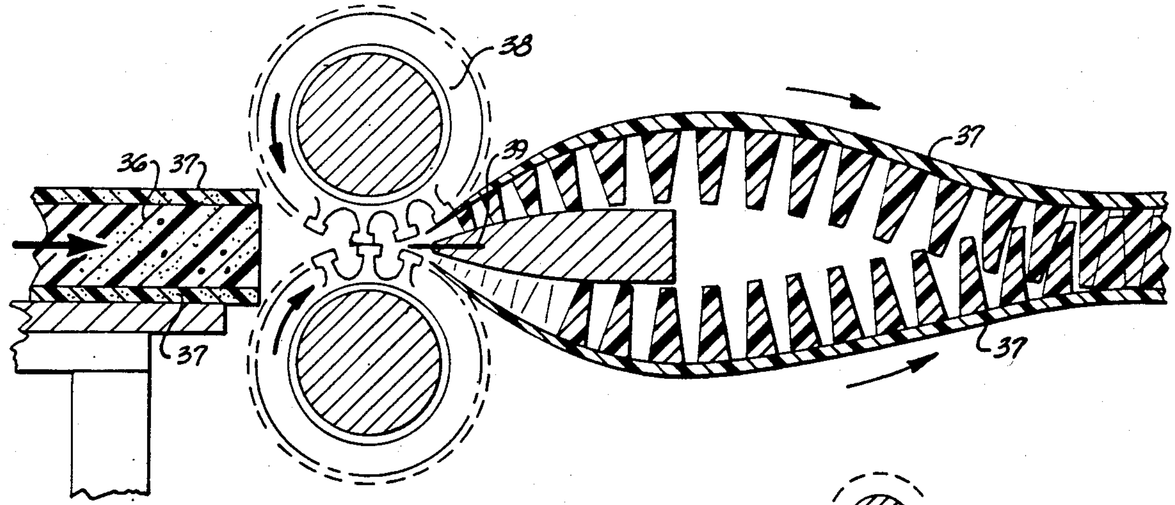
FIG. 13 is a longitudinal sectional elevation illustrating a modified form of the invention which includes feeding a single pad forming block or blank sandwiched between compressible auxiliary blocks or sheet members between the rolls of a convoluter machine, and cutting the pattern forming block while thus compressed along an intermediate transverse axis.

FIG. 13 illustrates a modified form of the method which includes feeding a single pad forming block or blank 36 sandwiched between compressible auxiliary block or sheet members 37 between the rolls 38 of a convoluter machine, and cutting the pattern forming block while thus compressed along an intermediate transverse axis utilizing the saw blade 39.

Figure 14:
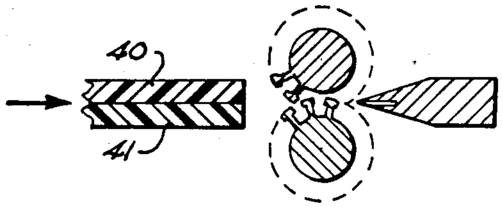
FIG. 14 shows a further modified form of the invention in which a pair of pad forming blocks are stacked and passed through the rolls of a convoluter preparatory to cutting wherein one of the pattern forming blocks acts as an auxiliary block for the other during passage through the convoluter.

A further modified form of the invention is illustrated in FIG. 14 in which a pair of pad forming blocks 40 and 41 are stacked and passed through the rolls of a convoluter preparatory to sawing wherein one of the pattern forming blocks acts as an auxiliary block for the other during passage through the convoluter.

Figure 15:
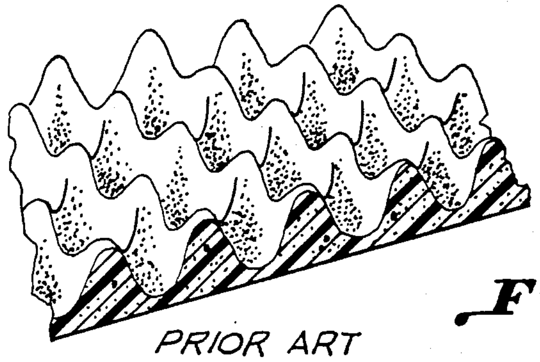
FIG. 15 illustrates the prior art wherein sinuous peaks and valleys are formed in the usual convoluter pad by passing a single pad forming foam block through the rolls of a convoluter.

FIG. 15 illustrates the prior art wherein sinusoidal peaks and valleys are formed in the usual convoluter pad by passing a single pad forming foam block through the rolls of a convoluter.

Figure 16:
FIG. 16 illustrates a pad formed by carrying out a method in accordance with FIG. 13, FIG. 16-A illustrates a pad constructed utilizing the method of FIG. 13 with less compression than that utilizing in forming the pad in FIG. 16.
Figure 16:
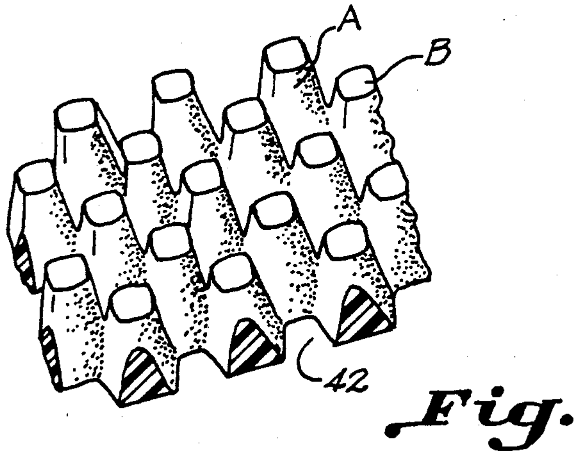

FIG. 16 illustrates a pad formed by carrying out a method in accordance with FIG. 13 wherein projections A have flat top portions B which are more pronounced than the checkerboard patterns of the earlier Figures of the drawing, FIGS. 1–8 and 10–12. The voids pass entirely through the pads as illustrated at 42. This embodiment affords the important advantage of low production costs but less foam contacts the user. This disadvantage may be partially overcome by utilizing thicker blanks. Two pads are formed at one time in a single pass of the blank stock through the convoluter.

FIG. 16-A illustrates a pad constructed utilizing the method of FIG. 13 with less compression than that utilized in forming the pad in FIG. 16 so that the peaks are rounded as usual but the voids extend entirely through the pads as illustrated at 43.

A pair of stacked pad forming blocks or blanks are illustrated at 44 and 45 in FIG. 17 sandwiched between auxiliary blocks 46 and 47 of compressible material preparatory to passing between the rolls of a convoluter prior to sawing or cutting between the pattern forming blocks for forming voids in a pad producing a checkerboard design with voids extending completely or partially through the support pad as illustrated in FIGS. 18 and 18-A.

FIG. 17-A is an end elevation illustrating a pair of stacked pad formed members such as shown in FIG. 17 passing between the rolls of a convoluter wherein the wheels 50 forming the convoluter rolls are removed as at 51 so as to form a border or marginal portion of the pad with no voids or raised projections as a solid border.

FIG. 18 shows a pad having generally checkerboard projections on one side, formed in accordance with the method of FIGS. 17 and 17-A, providing a border 52 on side edges. FIG. 18-A illustrates a pad similar to FIG. 18, except that the compression exerted by the convoluter wheels is not so pronounced so that the voids do not pass entirely through the pad. FIGS. 18 and 18A illustrate pads generally possessing a checkerboard pattern of projecting portions A and void or valley portions C exhibited by the pads of FIGS. 1–7 and 9–12. The voids pass entirely through the pad as at 53 forming a one-sided pad. The pad of FIG. 1, for example, is a two-sided pad. The apex portions are flat as at C. The pad of FIG. 18 has the V-shaped cutouts as at 13. The pads are formed in a single pass of the pad forming stock through the convoluter.

Figure 19:
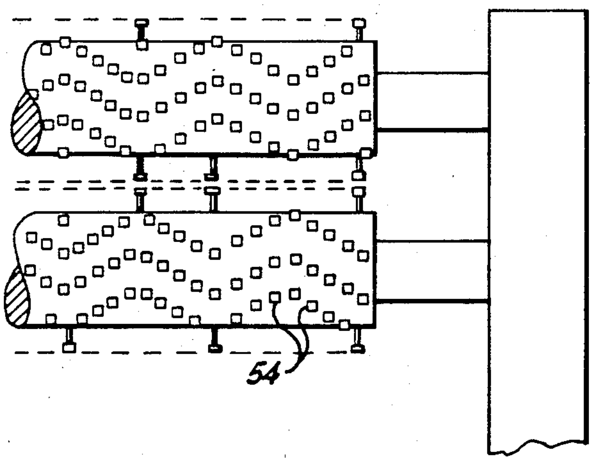
Fig. 19. PRIOR ART
FIG. 19 is an end elevation illustrating the rolls of a convoluter wherein the wheels are carried in an undulating or wave-like pattern in accordance with the prior art.
Figure 20:
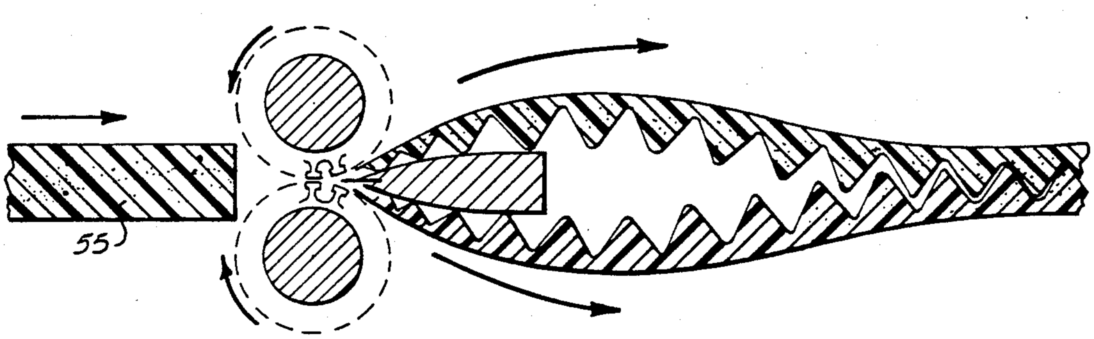
PRIOR ART Fig. 20.
FIG. 20 is a transverse sectional elevation illustrating the passage of a single pad forming member passing through the apparatus of FIG. 19, wherein the pad forming member is split into a pair of pads in accordance with the prior art.
Figure 21:
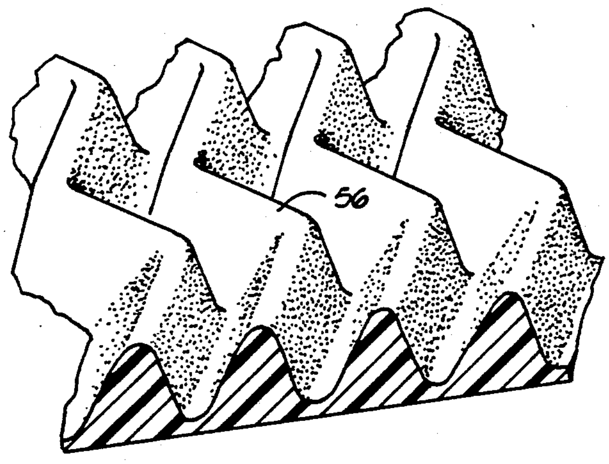
PRIOR ART Fig. 21.
FIG. 21 illustrates one of the pads formed by the method of FIG. 20 wherein a number of ridges run at right angles across a pad as it passes through the apparatus of FIG. 20 forming sinuous or wave-like ridges thereacross, having rounded apex portions in accordance with the prior art.

FIG. 19 is an end elevation illustrating the rolls of a convoluter wherein the wheels are carried in an undulating or wave-like pattern 54 in accordance with the prior art. FIG. 20 illustrates the passage of a single pad 55 forming member passing through the apparatus of FIG. 19, wherein the pad forming member is split into a pair of pads in accordance with the prior art. FIG. 21 illustrates one of the pads formed by the method of FIG. 20 wherein a number of ridges run at right angles across a pad as it passes through the apparatus of FIG. 20 forming sinuous or wave-like ridges thereacross, having rounded apex portions 56, also, in accordance with the prior art.

Figure 22:
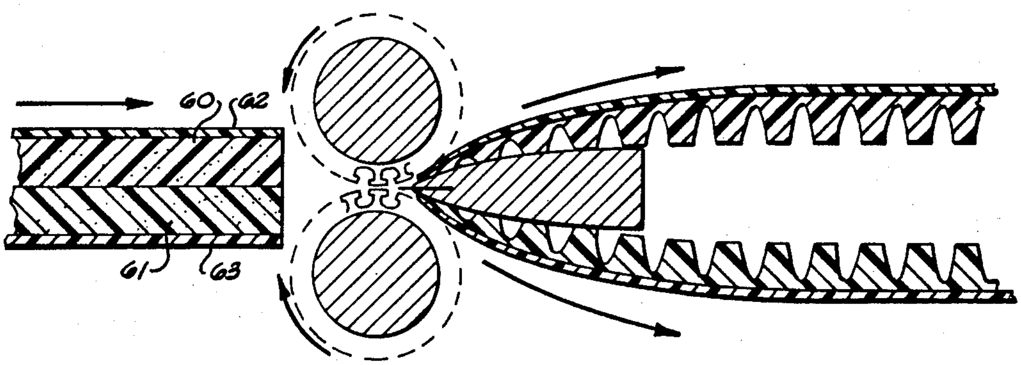
FIG. 22 is a longitudinal sectional elevation illustrating a pair of stacked pattern forming foam blocks having compressible auxiliary members sandwiching the pad forming blocks therebetween passing through the rolls of a convoluter as illustrated in FIG. 19.
Figure 23:
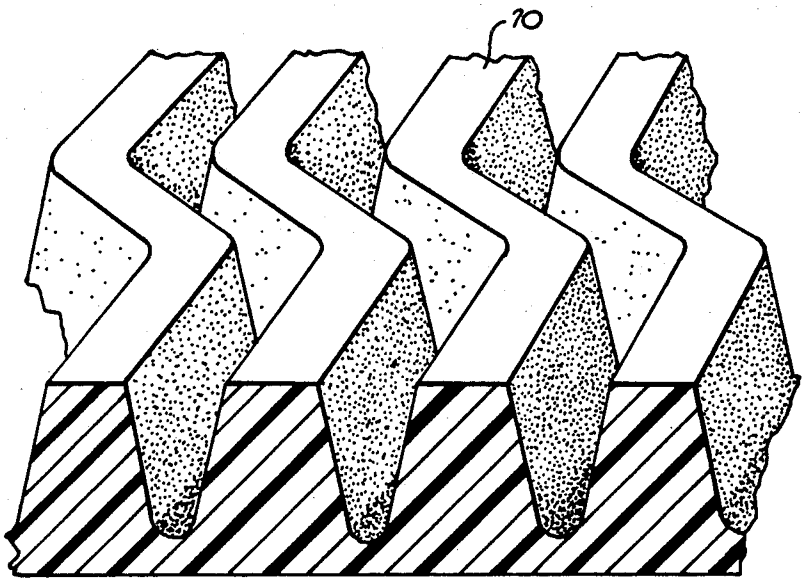
FIG. 23 is a perspective view illustrating a pad constructed in accordance with the apparatus and method of FIG. 22 wherein the transverse wave-like ridges each have a planar apex surface.

FIG. 22 illustrates a pair of stacked pattern forming foam blocks 60 and 61 having compressible auxiliary members 62 and 63 sandwiching the pad forming blocks therebetween passing through the rolls of a convoluter modified as illustrated in FIG. 19. FIG. 23 illustrates a pad constructed in accordance with the apparatus and method of FIG. 22 wherein the transverse wave-like ridges each have a planar apex surface as illustrated at 70.

It is thus seen that a versatile pad has been provided which includes an articulated surface, wherein the upstanding projections each act as individual springs, being compressible, independent of adjacent projections. Such independent action provides a firm support while at the same time, improved ventilation is provided. Such ventilation is further enhanced if the voids pass entirely through the pad as shown in several of the embodiments of the invention illustrated. The two-sided pad provides greater support because it uses more foam than the conventional pad. The split pads have planar apex portions providing the important advantage of increased air flow with better weight distribution together with the added advantage of being less expensive to manufacture.

The flat surfaces of the pads illustrated herein provide better weight distribution with less pressure per square inch of body area contacted by the printed projections of the conventional convoluted pad. Increased air circulation provides better heat transfer adding to the comfort of the user as well as avoiding the adverse affects of limiting the blood circulation of the patient. Good air circulation tends to remove moisture which tends to mascerate the skin of the patient.

While a preferred embodiment of the invention has been described using specific terms, such description is for illustrative purposes only and it is to be understood that changes and variations may be made without departing from the spirit or scope of the following claims.

What is claimed is:

1. The method of making a foam pad, comprising the steps of:

feeding at least one foam pad blank separably together with at least one compressible auxiliary blank into a convoluter machine having rolls with spaced projections thereon compressing discrete areas of said foam and compressible blanks, said foam blank and said compressible blank being in stacked relation when passing between the rolls of the convoluter machine; and sawing said foam blank while in a compressed state emerging from such rolls to thereby form a plurality of promontories on said foam blank having flat apex portions.

2. The method set forth in claim 1 wherein said feeding step includes feeding at least one compressible blank on each side of said foam pad blank into said convoluter machine.

3. The method of making a foam pad comprising the steps of:

feeding at least a pair of stacked separable foam pad blocks separably together with at least one compressible auxiliary block into a convoluter machine having rolls with spaced projections thereon compressing discrete areas of said foam and compressible blocks; and sawing said foam block while in a compressed state emerging from such rolls to thereby form a plurality of promontories on said foam blocks, said promontories having flat apex portions.

4. The method set forth in claim 3 wherein auxiliary blocks are carried on both sides of said pair of stacked blocks.

5. The method set forth in claim 3 including arranging said projections on the rolls of the convoluter machine in a wavy pattern to thereby form wavy ridges across said form blocks.

6. The method set forth in claim 4 including arranging the roll projections in a substantially checkerboard pattern.

7. The method set forth in claim 4, wherein the roll projections are not present on marginal portions of the convoluter machine rolls, thereby forming a solid foam boarder on each side of the pads.

8. A method as in claim 1, wherein the compression of the rolls is controlled so as to form voids through said foam blank between adjacent promontories thereof.

9. A method of manufacturing a resilient foam pad from a resilient foam blank, said pad having a plurality of upstanding promontories and valleys alternating in a predetermined pattern, and said method using a convoluter machine of the type having transversely disposed compression means for differentially compressing in accordance with the predetermined pattern materials fed therethrough, and slicing such materials with a transverse blade while same are still under compression, whereby alternating valleys and promontories in accordance with such pattern are formed in at least one side of said pad, said method comprising:

providing at least one generally planar resilient foam blank;

placing at least one auxiliary resilient planar sheet in a separable contiguous relationship with said blank;

simultaneously forwarding said blank and said auxiliary sheet separably contiguous therewith through the convoluter machine so as to produce alternating promontories and valleys in said blank so as to form said pad from said blank; and thereafter separating said auxiliary sheet from said pad.

10. A method as in claim 9, further including the steps of preselecting the thickness of said auxiliary resilient sheet and the degree of compression exerted by the convoluter machine so that said valleys form voids extending completely through said pad, with said promontories remaining integrally connected at their respective bases.

11. A method as in claim 10, wherein said forwarding step produces planar apex surfaces in said promontories, and said preselecting step includes varying said degree of compression so as to select the area of said apex surfaces.

12. A method as in claim 9, wherein the predetermined pattern of the convoluter machine is a wave-like pattern, and said method includes the step of controlling the degree of compression of such machine so that the resulting pattern of said pad comprises transverse wave-like ridges having planar apex surfaces.

13. A method as in claim 9, wherein said auxiliary resilient sheet is of a different density than that of said resilient blank.

14. A method as in claim 9, wherein said auxiliary sheet is of substantially the same construction as said blank.

15. A method as in claim 9, including the step of providing at least two auxiliary resilient planar sheets, and placing one each on each side of said blank separably contiguous therewith, said auxiliary sheets both beign subsequently removed from said pad in said separating step.

16. A method as in claim 15, including the step of providing at least two generally planar resilient foam blanks, placed in separable contiguous relationship with respect to each other, and with said auxiliary sheets similarly situated thereabout, both of said auxiliary sheets being subsequently removed from said pad in said separating step.

* * * * *